United States P
Solomon et al.

3,843,843
Oct. 22, 1974

[54] A TIME DIVISION MULTIPLE ACCESS SYNCHRONIZATION TECHNIQUE

[75] Inventors: Karl Solomon, Haddonfield; John Ross Allen, Cherry Hill, both of N.J.

[73] Assignee: RCA Corporation, New York, N.Y.

[22] Filed: Oct. 30, 1972

[21] Appl. No.: 301,897

[52] U.S. Cl. .................................. 179/15 BS, 325/4
[51] Int. Cl. .............................................. H04j 3/06
[58] Field of Search........ 179/15 BS; 325/4; 343/7.5

[56] References Cited

UNITED STATES PATENTS

| | | | |
|---|---|---|---|
| 3,530,252 | 9/1970 | Puente | 179/15 BS |
| 3,593,138 | 7/1971 | Dunn | 325/4 |
| 3,730,998 | 5/1973 | Schmidt | 179/15 BS |
| 3,742,498 | 6/1973 | Dunn | 343/7.5 |

*Primary Examiner*—Ralph D. Blakeslee
*Attorney, Agent, or Firm*—Edward J. Norton; Joseph D. Lazar; Donald E. Mahoney

[57] ABSTRACT

A transmitting station gains access to a time division multiple access communication system without interferring with existing system communications by transmitting frequency shift modulated narrow band accessing signals to the system relay station which may be ground-based or in an orbiting satellite. By transmitting the accessing signals at a frequency located within the spectral null of the information signals being transmitted by the other stations in the system, the accessing signals can be processed to cause the signal transmission from the new station to occur in the correct time slot within the system time frame without interferring with the transmission of the other stations in the system.

8 Claims, 3 Drawing Figures

A TIME DIVISION MULTIPLE ACCESS SYNCHRONIZATION TECHNIQUE

DESCRIPTION OF THE PRIOR ART

A variety of signal multiplexing techniques have been used in conjunction with a satellite relay station, for example, to provide improved communications between widely separated earth stations. An example of one such technique is the use of a time division multiple access (TDMA) system for satellite multiplexing. A number of earth stations sharing the satellite relay station are assigned equal time slots within a fixed TDMA system time frame. A detailed explanation of an experimental system is described in an article entitled "A Satellite Time-Division Multiple-Access Experiment" by T. Sekimoto and J. Puente in the IEEE Transactions on Communication Technology, Vol. Com-16, No. 4, August 1968. The earth stations sharing the satellite relay station must gain access to the satellite relay station without overlapping the time slots assigned to other earth stations and interrupting the communications already in progress. This is difficult to do when the range from the earth station to the satellite is not precisely known at all times.

In one technique suggested in the prior art, a particular earth station is designated as a reference station and transmits an identifying coded pulse at the beginning of each transmission burst. A second earth station desiring access to the satellite also transmits an identifying coded pulse as close as possible to its assigned time slot. The coded pulses of the reference and second stations are relayed back to the receiver of the second station by the satellite. The position of the coded pulse of the second station relative to the transmission of the reference station is then determined. The phase of the coded pulse of the second station is varied until the pulse transmitted by the second station appears at the beginning of its assigned time slot. The difficulty with this method is that the magnitude of the power transmitted by the second station is at the normal operating level and any error in predicting the timing of the transmission from the second station can cause the transmitted signal to overlap other assigned time slots and interfere with communications between other stations.

U.S. Pat. No. 3,530,252, entitled "Acquisition Technique for Time Division Multiple Access Satellite Communication System", issued to John G. Puente on Sept. 22, 1970, discloses a method which attempts to avoid the possibility of interferring with other ground stations in a TDMA system during the accessing mode. In that method, a new station desiring access to the system transmits low power access pulses of unmodulated RF power to the satellite. The bandwidth of the transmitted access pulses is narrower than that of the information pulses transmitted by the other ground stations, the access pulses being readily distinguishable from the information pulses. The access pulses are relayed by the satellite back to the ground stations where the position of the access pulses with respect to the information pulses is observed. The phase of the access pulses is adjusted until the access pulses appear at the beginning of their assigned time slot. The magnitude of the access pulses is selected to be relatively low in order to reduce interference with the communications of other stations if the transmitted access pulses do appear in an unassigned and occupied time slot. However, amplitude variations in the access pulse relayed from the satellite due to pulse overlap of an occupied time slot and an empty time slot can cause error in the determination of the proper assigned time slot.

SUMMARY OF THE INVENTION

A method and apparatus according to the invention enables a new transmitting station to gain access to a desired time slot assigned to the station for information transmission to a relay station operating in a time division multiple access communication system. The communication system has other transmitting stations each assigned a different time slot within a predetermined time frame for transmitting information signals at a predetermined frequency and power level to the relay station. The relay station relays the transmitted information signals to other stations sharing the system. The new station gains access to its assigned time slot without interferring with existing communications by transmitting to the relay station a predetermined number of frequency shift modulated narrow band accessing signals repetitive at the communication system frame rate. The power level of the accessing signals is substantially lower than the predetermined power level of the information signals transmitted by the other stations. The accessing signals are transmitted at a frequency located within the spectral null of the information signals transmitted by the other stations. The accessing signals and information signals relayed by the relay station are detected at the new station. The position of the relayed accessing signals within the system time frame is compared with the relative position of the relayed information signals transmitted by other stations. The transmission time of the accessing signals can then be controlled to correspond to the desired time slot assigned to the new station.

DESCRIPTION OF THE DRAWING

Referring to FIG. 1, there is shown, according to the prior art, a simplified block diagram of a TDMA system and a diagrammatic representation of a fixed TDMA system time frame, $T_f$, which is divided into equal time slots each assigned to a number, $n$, of different transmitting stations. The position of the assigned time slots are relative to the time slot of a master station. As an example, assume that there are four transmitting stations A, B, C and D and the fixed time frame, $T_f$, is 100 microseconds, station A being the master station. The length of the assigned time slot for each station is then $T_f/n$, or 25 microseconds. Stations C and D are in communication with the relay station and locked in their assigned time slots as indicated by the transmitted information bit pulses 10 shown as having been received at the satellite relay station for each of the respective stations A, C and D. The problem is for station B to gain access to the satellite relay station within its assigned time slot without interferring with the communications of the other stations A, C and D.

Figure 1:
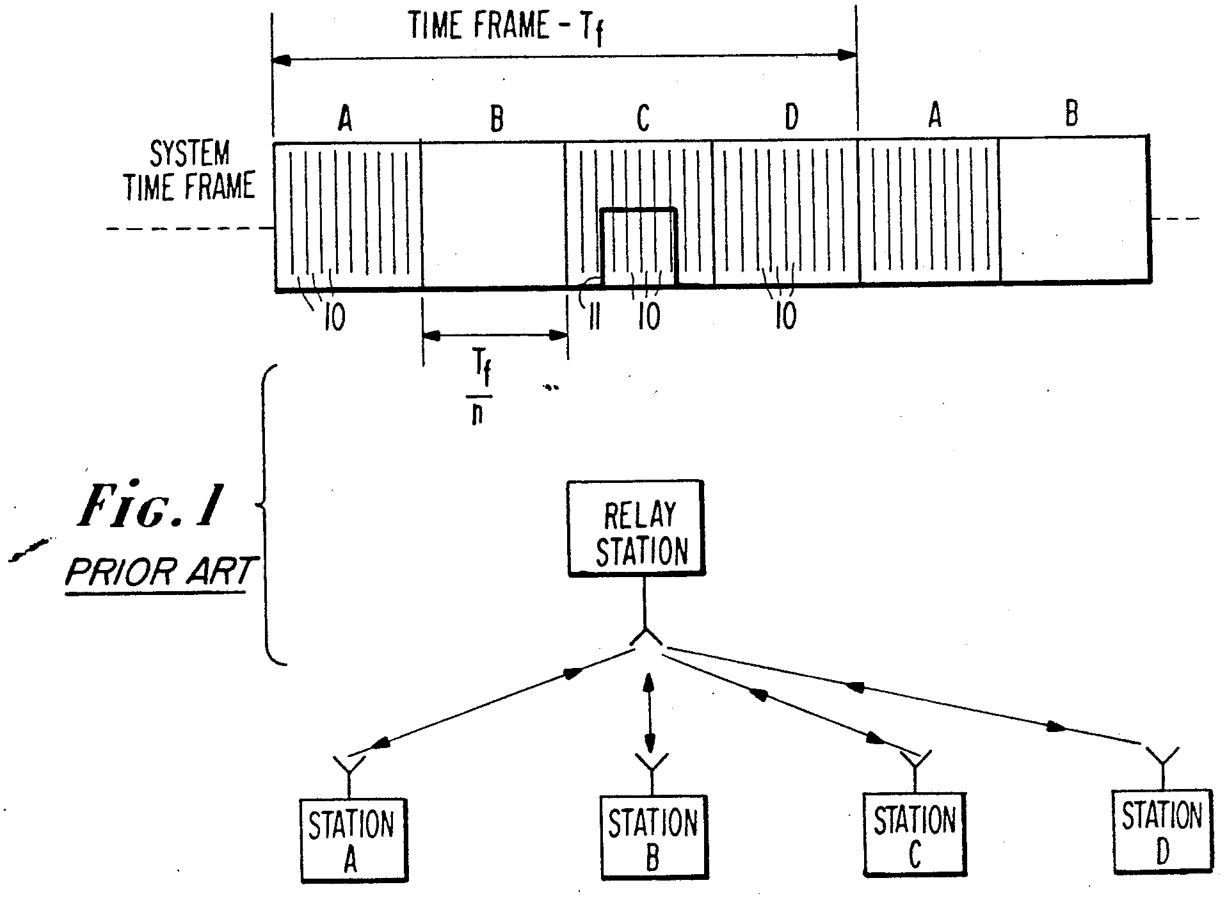
FIG. 1 PRIOR ART
FIG. 1 is a simplified block diagram of a TDMA system and a diagrammatic representation of the TDMA system time frame according to the prior art.

In certain systems of the prior art relatively low power unmodulated RF pulses 11 having a pulse width substantially longer than the pulse width of the information bit pulses 10 are usually continuously transmitted to the relay station by station B as initial accessing pulses. By way of example, the accessing pulse 11 intended to occur during time slot B is shown in FIG. 1 as originally occurring during the time slot of station C. The power level of the accessing pulses is substantially lower than the power level of the information pulses 10 transmitted by other stations to the relay station. The accessing pulses 11 and the information bit pulses 10 are relayed by the relay station back to the receiver of the new station desiring access to the system. The received accessing pulses are transmitted through a narrow band pass filter, not shown. The narrow band pass filter is usually designed to block the information bit pulses transmitted by other stations. The position of the received accessing pulses within the system time frame is compared with the position of the information bit pulses 10 transmitted by other stations. The transmission time of the accessing pulses is adjusted until the leading edge of the accessing pulse appears at the beginning of a desired time slot. Thus, the accessing pulse 11 shown in FIG. 1 would be moved time wise to occur within the time slot B. The preamble word of the new station is then transmitted, and the new station is turned on to full power. This typical power limited method of gaining access to the system could result in a relayed accessing signal that is amplitude modulated. An amplitude modulated accessing signal could contribute to an error in the determination of the beginning of the desired time slot. This is especially true when part of the accessing signal overlaps a time slot in use by another transmitting station and an adjacent empty time slot.

In a TDMA system, according to the present invention, low power frequency shift modulated narrow band accessing signals are transmitted to the relay station from a new station desiring access to the TDMA system. Frequency shift keying (FSK) is used in modulating the transmitted accessing signals. The transmitted accessing signals sequentially alternate between a pair of frequencies centered about a frequency at which the energy level of the information bit pulses transmitted by other stations is negligible. The duration of the accessing signal transmitted at any one frequency is equal to the system time frame. Therefore, the difference in time between first and second successive transitions in frequency is equal to the system time frame. The accessing signal of the new station is transmitted in the proper assigned time slot when a frequency transition occurs at the beginning of the assigned time slot.

The frequency spectrum of typical digitized information bit pulses of the type transmitted by system stations has a $\sin^2 x/x^2$ characteristic on both sides of a center frequency $f_c$. This characteristic determines several frequencies at which the energy level of the information bit pulses is negligible. The TDMA relay station uses a suitable matched filter detection process for the transmitted information bit pulses arranged as known in the art to have the same shape as the signal spectrum. Therefore, a narrow band accessing signal transmitted at one of the energy nulls is rejected by such a matched filter. The frequency, $f_c + \Delta f$, at which one of these energy nulls occurs, is the center frequency about which the accessing signals are transmitted by the new station to the satellite relay station. Thus, by transmitting relatively low power accessing signals in an energy null, the accessing signals are inherently incapable of interferring with the communications of other transmitting stations.

Figure 2:
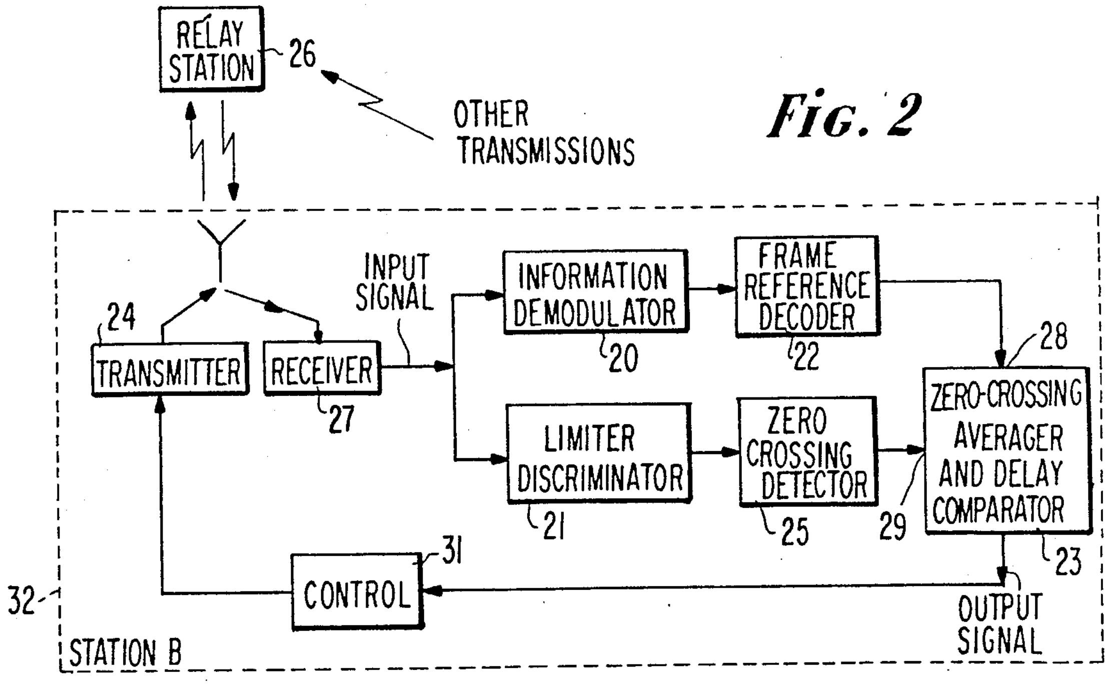
FIG. 2 is a block diagram of an apparatus used by a new station to gain access to a TDMA system according to the present invention.
Figure 3:
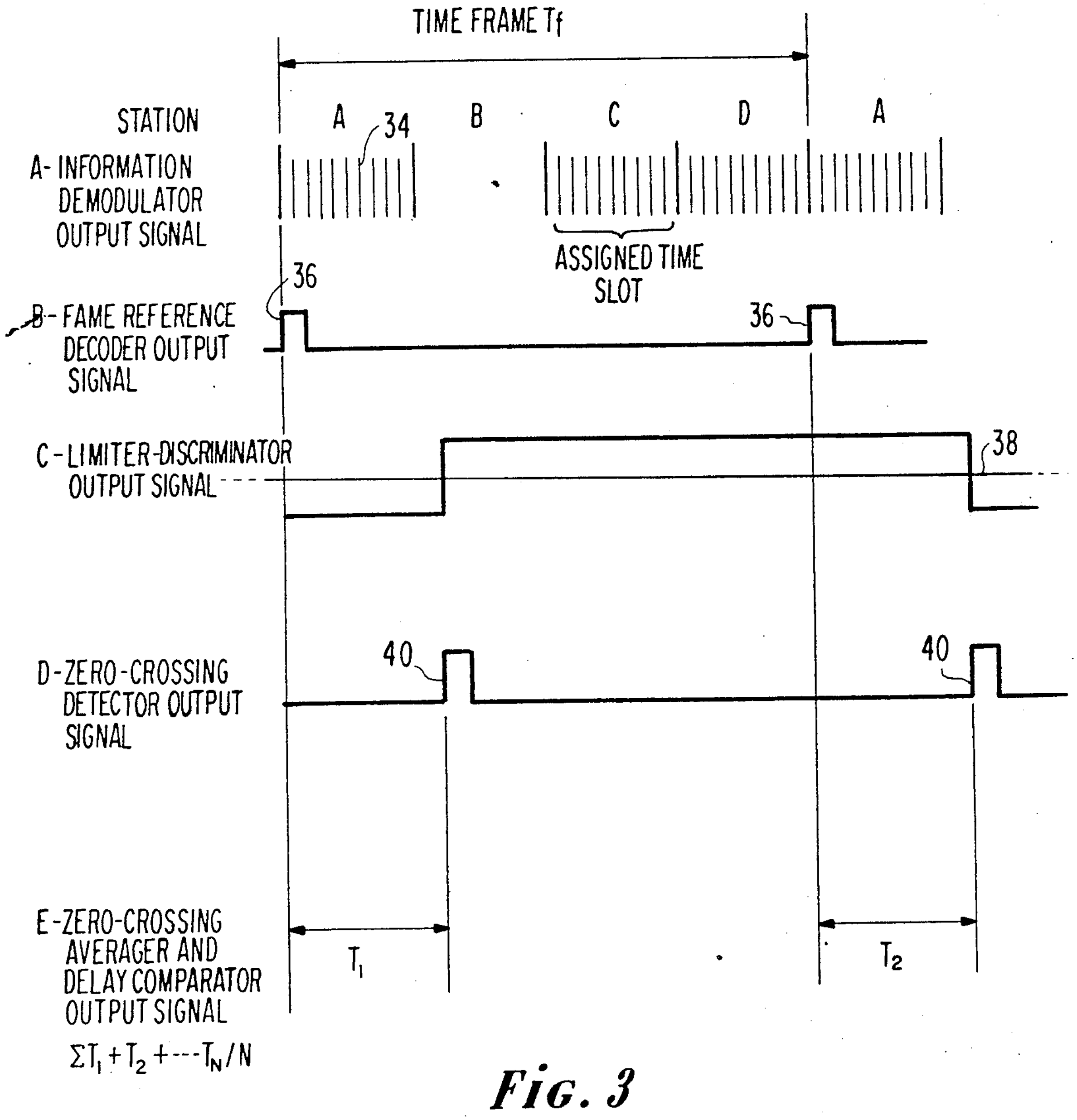
FIG. 3 is a series of waveforms related to the operation of the system in FIG. 2.

Referring to FIGS. 2 and 3, there is shown a block diagram (FIG. 2) of an apparatus used by a new station 32 (Station B) desiring access to a TDMA system according to the present invention, and a series of waveforms (FIG. 3) related to the operation thereof. The transmitter 24 of the new station transmits a predetermined number of frequency shift modulated narrow band accessing signals repetitive at the TDMA system frame rate, $1/T_f$, to the system relay station 26. To this end, the transmitter 24 may include known circuitry for accomplishing the frequency shift keying transmissions and is shown in block form only for purposes of the present description. The information signals transmitted by other stations, (such as stations A, C or D of FIG. 1) indicated by the arrow 30, and the accessing signals, transmitted by the new station transmitter 24, are relayed by the system relay station 26 to the receiver 27 of the new station. The received signal is simultaneously fed as a receiver input signal along a first path to an information demodulator 20 and along a second path to a limiter-discriminator 21. The information demodulator 20 is suitably arranged as known in the art to receive negligible energy from the accessing signals and to process only the relayed information bit pulses transmitted by the other stations. The information demodulator 20 converts the relayed information bit pulses 10 (FIG. 1) into digitized information signals 34 having varying amplitudes. The information demodulator 20 may either be a phase shift keying (PSK) demodulator or a frequency shift keying (FSK) demodulator depending on the type of modulation used by the other stations.

The information demodulator 20 output signal, illustrated in waveform A of FIG. 3, is coupled to a suitable frame reference decoder 22. The frame reference decoder 22 is arranged to indicate a reference signal from which the position of an assigned time slot within the system time frame can be determined. One suitable method of establishing the reference signal contemplates designating a master or reference transmitting station that continuously transmits a unique pulse or sequence of pulses preceding each information burst. The frame reference decoder 22 detects the unique pulse sequence of the reference station and generates a frame reference pluse as illustrated in waveform B of FIG. 3. The leading edge 36 of the frame reference pulse in waveform B of FIG. 3 indicates the beginning of the TDMA system time frame, $T_f$. The output signal from the frame reference decoder 22 (FIG. 2) is coupled to a first input port 28 of a two-input port zero-crossing averager and delay comparator 23.

The limiter-discriminator 21 is arranged to transmit only the frequency shift modulated accessing signals relayed from relay station 26. The limiter-discriminator 21 is also arranged to block the information bit pulses centered at the frequency $F_c$. The limiter-discriminator output signal contains information relative to the occurrence of the frequency shifts of the accessing signal. The limiter-discriminator's output signal, illustrated as waveform C of FIG. 3, is coupled to a zero-crossing detector 25. The zero-crossing detector 25 indicates when the frequency shifts of the accessing signal occur. A suitable technique is utilized to establish a reference voltage level 31 for the output signal from the limiter-discriminator 21, for example as shown in waveform C. The zero-crossing detector 25 is triggered into generating an output signal pulse when the magnitude of the limiter-discriminator output signal equals the magnitude of the reference voltage level 38. The output signal from the zero-crossing detector 25 is illustrated in waveform D of FIG. 3. The output signal pulse from the zero-crossing detector 25 is coupled to a second input port 29 of comparator 23. The zero-crossing averager and delay comparator 23 determines the average delay time between the frame reference decoder output pulses and the zero-crossing detector output pulses.

The differential time measurements, $T_1, T_2 \ldots T_N$, between a reference time indicated by the leading edge 36 of the output signals from the frame reference decoder 22 and the leading edge 40 of the output signals from the zero-crossing detector 25 are averaged by comparator 23 over the time period required for the transmitter 24 to transmit a predetermined number, N, of accessing signals. A number of differential time measurements are averaged by the comparator 23 in order to reduce the probability of transmitting the information burst of the new station (B) in the wrong time slot.

A predetermined number of accessing signals are transmitted by the new station in order to prevent the possibility of two or more new stations from transmitting accessing signals at the same time and causing an erroneous determination of an assigned time slot. Each frequency shift or frequency transition induces the zero-crossing detector to generate an output pulse. The number of output pulses generated by the zero-crossing detector 25 over the accessing period correspond to the predetermined number of accessing signals transmitted by transmitter 24 of the new station. An interference condition is detected and the output signal from the zero-crossing averager and delay comparator discounted when the number of output pulses generated by the zero-crossing detector 25 is not exactly equal to the predetermined desired value.

It will be noted that the receiver 27 can be arranged according to the invention to be operable only during a period corresponding to the estimated limits of a round trip signal delay from the new station to the relay station plus the duration of the accessing transmission. Therefore, acquisition of transmissions from other stations occurring outside of this period is inhibited. This further insures against the reception of incorrect transmissions.

The transmission time of the relayed accessing signals relative to a reference time is adjusted until the signals appear within a time slot corresponding to that assigned to the new station. Thus, the output of comparator 25 can be fed to transmitter 24 via a suitable control means 31, which alters the timing of the accessing transmission until it occurs in the proper time slot as indicated at the output of comparator 25. The transmitter 24 of the new station is then turned on to full power, and transmits information bit pulses or fine synchronization pulse sequences within its assigned time slot (B). The station burst can be maintained in synchronism by several known methods. One such method is described in an article entitled "Design of a Satellite Time Division Multiple-Access Burst Synchronizer" by O. G. Gabbard in the IEEE Transactions on Communications Technology, Vol. Com-16, No. 4, August 1968.

The invention has been shown and described with reference to a preferred embodiment. Other arrangements can readily be devised in accordance with the disclosed principles as will be apparent by those skilled in the art.

What is claimed is:

1. In a time division multiple access communication system having plural transmitting stations each assigned a time slot within a predetermined time frame for transmitting information signals at a predetermined frequency and power level to a relay station for relaying said signals to said system stations, a method for a new transmitting station to gain access to said communication system for transmitting information bursts to said relay station within a desired time slot without interferring with said information signals transmitted by said plural stations comprising the steps of:

transmitting from said new station to said relay station a predetermined number of frequency shift modulated narrow band accessing signals repetitive at the communication system frame rate and having a power level substantially lower than said predetermined power level at frequencies located within the spectral null of said information signals of said other stations, detecting at said new station said accessing signals and said information signals relayed by said relay station, comparing at said new station the position of said relayed accessing signals within said system time frame relative to said relayed information signals, and controlling the time of transmission of said accessing signals to correspond to said desired time slot within said system time frame.

2. A method for a new station to gain access to a time division multiple access communication system according to claim 1 further comprising detecting at said new station the beginning of said system time frame.

3. A method for a new station to gain access to a time division multiple access communication system according to claim 2 further comprising detecting at said new station the occurrence of a predetermined number of frequency shifts of said frequency shift modulated accessing signals.

4. A method for a new station to gain access to a time division multiple access communication system according to claim 3 further comprising averaging the delay between said beginning of said system time frame and said frequency shift occurrence.

5. In a time division multiple access communication system having plural transmitting stations each assigned a time slot for transmitting information signals at a predetermined frequency and power level within a predetermined time frame to a relay station for relaying said signals to said system stations, an apparatus for a new transmitting station to gain access to said communication system for transmitting information bursts to said relay station within a desired time slot without interferring with said information signals transmitted by said plural stations comprising:

a transmitter at said new station for transmitting to said relay station a predetermined number of frequency shift modulated narrow band accessing signals repetitive at the communication system frame rate and having a power level substantially lower than said predetermined power level at frequencies located within the spectral null of said information signals, and means for detecting at said new station the position within said system time frame of said accessing signals relayed by said relay station, means for controlling the time of transmission of said accessing signals to correspond to said desired time slot within said system time frame.

6. Apparatus for a new transmitting station to gain access to a time division multiple access communication system according to claim 5 further comprising means for detecting the beginning of said system time frame at said new station.

7. Apparatus for a new transmitting station to gain access to a time division multiple access communication system according to claim 6 further comprising means for detecting the occurrence of a predetermined number of frequency shifts of said frequency shift modulated accessing signals at said new station.

8. Apparatus for a new station to gain access to a time division multiple access communication system according to claim 7 further comprising means for averaging the delay between said beginning of said system time frame and said frequency shift occurrence.

* * * * *